United States Patent
Lee et al.

(10) Patent No.: US 10,329,416 B2
(45) Date of Patent: Jun. 25, 2019

(54) THERMOPLASTIC RESIN COMPOSITION AND MOLDED ARTICLE MANUFACTURED FROM THE SAME

(71) Applicant: LG CHEM, LTD., Seoul (KR)

(72) Inventors: Won Seok Lee, Daejeon (KR); Jeong Su Choi, Daejeon (KR); Keun Hoon Yoo, Daejeon (KR); Seok Goo Jang, Daejeon (KR); Roo Da Lee, Daejeon (KR); Sang Hoo Park, Daejeon (KR); Ho Hoon Kim, Daejeon (KR); Hyung Seop Shim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

(21) Appl. No.: 15/577,967

(22) PCT Filed: Mar. 2, 2017

(86) PCT No.: PCT/KR2017/002251
§ 371 (c)(1),
(2) Date: Nov. 29, 2017

(87) PCT Pub. No.: WO2017/160011
PCT Pub. Date: Sep. 21, 2017

(65) Prior Publication Data
US 2018/0134889 A1    May 17, 2018

(30) Foreign Application Priority Data

Mar. 18, 2016  (KR) .......................... 10-2016-0032569

(51) Int. Cl.
| | | |
|---|---|---|
| C08L 33/12 | (2006.01) | |
| C08L 37/00 | (2006.01) | |
| C08L 51/04 | (2006.01) | |
| C08F 279/02 | (2006.01) | |
| C08F 220/14 | (2006.01) | |

(52) U.S. Cl.
CPC ............ C08L 51/04 (2013.01); C08F 279/02 (2013.01); C08L 33/12 (2013.01); *C08F 220/14* (2013.01)

(58) Field of Classification Search
CPC .......... C08L 33/12; C08L 51/04; C08L 37/00; C08L 25/12
See application file for complete search history.

(56) References Cited

U.S. PATENT DOCUMENTS

| | | |
|---|---|---|
| 3,463,833 A | 8/1969 | Isogawa |
| 3,787,522 A | 1/1974 | Dickie et al. |
| 7,932,336 B2 | 4/2011 | Pickett et al. |
| 2003/0171522 A1* | 9/2003 | Brandenburg ........ C08F 220/12 526/305 |
| 2014/0296461 A1 | 10/2014 | Joo et al. |

FOREIGN PATENT DOCUMENTS

| | | |
|---|---|---|
| EP | 514071 A1 | 11/1992 |
| EP | 0 703 252 A2 | 3/1996 |
| JP | S63-42940 A | 2/1988 |
| JP | 2000-095957 A | 4/2000 |
| KR | 10-1989-0010108 A | 8/1989 |
| KR | 10-0465879 B1 | 1/2005 |
| KR | 10-2005-0071482 A | 7/2005 |

OTHER PUBLICATIONS

International Search Report for International Patent Application No. PCT/KR2017/002251, filed Mar. 2, 2017.
Extended European Search Report for Application No. 17766912.4, dated Oct. 15, 2018.

\* cited by examiner

*Primary Examiner* — Jeffrey C Mullis

(57) ABSTRACT

The present disclosure relates to a thermoplastic resin composition and a molded article manufactured from the same. More particularly, the present disclosure relates to a thermoplastic resin composition including (A) a graft copolymer prepared by graft-copolymerizing a conjugated diene rubber, a (meth)acrylic acid alkyl ester compound, a methylene butyrolactone compound, and an aromatic vinyl compound; and (B) a copolymer prepared by copolymerizing a (meth)acrylic acid alkyl ester compound, an aromatic vinyl compound, and a vinyl cyanide compound, and a molded article manufactured from the thermoplastic resin composition. In accordance with the present disclosure, a thermoplastic resin composition having superior heat resistance and transparency and a molded article manufactured from the same are provided.

20 Claims, No Drawings

THERMOPLASTIC RESIN COMPOSITION AND MOLDED ARTICLE MANUFACTURED FROM THE SAME

CROSS-REFERENCE TO RELATED APPLICATION

This application is a U.S. National Stage of International Patent Application No. PCT/KR2017/002251, filed Mar. 2, 2017, which claims the priority benefit of Korean Patent Application No. 10-2016-0032569, filed on Mar. 18, 2016, in the Korean Intellectual Property Office, the disclosure of which is incorporated herein by reference.

TECHNICAL FIELD

The present invention relates to a thermoplastic resin composition and a molded article manufactured from the same. More particularly, the present invention relates to a thermoplastic resin composition having superior heat resistance and transparency and a molded article manufactured from the same.

BACKGROUND ART

Since acrylonitrile-butadiene-styrene (hereinafter referred to as "ABS") resin including styrene as a main raw material has properties such as stiffness, chemical resistance, impact resistance, and processability and exhibits superior secondary processing characteristics such as superior impact strength, mechanical properties, surface gloss, plateability, printability, and paintability, it may be used to produce products having various colors. However, sole use of ABS resin in components such as components of automobile interior and exterior materials requiring heat resistance, a transparent window of a washing machine requiring transparency, a cleaner dust cup, and transparent windows of office equipment is limited.

A method of using a polycarbonate resin to impart transparency has difficulties in being applied to large-sized components due to low chemical resistance and low-temperature impact resistance and poor processability. In addition, U.S. Pat. No. 3,787,522 and Japanese Unexamined Patent Application Publication No. Sho 63-42940 have attempted to provide impact resistance to a transparent polymethylmethacrylate resin, but satisfactory results were not obtained. In the case of European Patent No. 0 703 252 in which a HIPS (High Impact Polystyrene) resin was provided with transparency, transparency and processability were superior, but chemical resistance and scratch resistance were decreased.

In addition, a method of adding a maleimide-based or α-methyl styrene-based monomer, as a monomer having superior heat resistance, to a portion of ABS resin during polymerization, blending a heat-resistant copolymer resin including the monomer with an ABS resin, or adding an inorganic substance and the like has been developed to impart heat resistance.

However, since such a maleimide-based monomer has a problem that it is very difficult to control reaction temperature due to very high polymerization speed, there is a limitation in increasing the content of the maleimide-based monomer in a resin, and compatibility with an ABS resin and impact strength are decreased with increasing content of the monomer. In addition, since the α-methyl styrene monomer requires a long reaction time due to very slow polymerization speed, productivity is decreased, the molecular weight of a polymer is low, and pyrolysis easily occurs.

Therefore, there is a need for development of a thermoplastic resin satisfying all of heat resistance, transparency, and the like.

DISCLOSURE

Technical Problem

Therefore, the present invention has been made in view of the above problems, and it is one object of the present invention to provide a thermoplastic resin composition having superior heat resistance and transparency and a molded article manufactured from the same.

The above and other objects can be accomplished by the present disclosure described below.

Technical Solution

In accordance with one aspect of the present invention, provided are a thermoplastic resin composition with superior heat resistance and transparency including (A) a graft copolymer prepared by graft-copolymerizing a conjugated diene rubber, a (meth)acrylic acid alkyl ester compound, a methylene butyrolactone compound, and an aromatic vinyl compound; and (B) a copolymer prepared by copolymerizing a (meth)acrylic acid alkyl ester compound, an aromatic vinyl compound, and a vinyl cyanide compound, and a method of preparing the thermoplastic resin composition.

In accordance with another aspect of the present invention, provided is a molded article manufactured from the thermoplastic resin composition.

Advantageous Effects

As apparent from the fore-going, the present invention advantageously provides a thermoplastic resin composition having superior heat resistance and transparency and a molded article manufactured from the same.

BEST MODE

Hereinafter, the present disclosure is described in detail.

A thermoplastic resin composition of the present disclosure includes (A) a graft copolymer prepared by graft-copolymerizing a conjugated diene rubber, a (meth)acrylic acid alkyl ester compound, a methylene butyrolactone compound, and an aromatic vinyl compound; and (B) a copolymer prepared by copolymerizing a (meth)acrylic acid alkyl ester compound, an aromatic vinyl compound, and a vinyl cyanide compound. Within this range, superior heat resistance and transparency are exhibited.

Now, each of the ingredients composing the thermoplastic resin composition of the present disclosure is described in detail.

(A) Graft Copolymer

In an embodiment, the graft copolymer may be prepared by graft-copolymerizing a conjugated diene-based rubber, a (meth)acrylic acid alkyl ester compound, a methylene butyrolactone compound, and an aromatic vinyl compound.

In an embodiment, the graft copolymer (A) may be prepared by graft-polymerizing 10 to 60% by weight of the conjugated diene rubber, 15 to 65% by weight of the (meth)acrylic acid alkyl ester compound, 1 to 20% by weight of the methylene butyrolactone compound, and 3 to 30% by weight of the aromatic vinyl compound; or 15 to 55% by weight of the conjugated diene rubber, 20 to 60% by weight of the (meth)acrylic acid alkyl ester compound, 5 to 15% by weight of a methylene butyrolactone compound, and 5 to 25% by weight of the aromatic vinyl compound. Within this range, mechanical properties, particularly impact resistance, are superior and natural color is provided.

In another embodiment, the graft copolymer (A) may be prepared by graft-polymerizing 20 to 50% by weight of the conjugated diene rubber, 25 to 55% by weight of the (meth)acrylic acid alkyl ester compound, 7 to 13% by weight of the methylene butyrolactone compound, and 7 to 20% by weight of the aromatic vinyl compound. Within this range, mechanical properties, particularly impact resistance, are superior and natural color is provided.

In an embodiment, the graft copolymer (A) may have a weight average molecular weight of 50,000 to 300,000 g/mol, 50,000 to 200,000 g/mol, or 60,000 to 150,000 g/mol. Within this range, impact strength and chemical resistance are superior, and superior processability is provided due to satisfactory fluidity.

The conjugated diene-based rubber is a polymer of conjugated monomers having a structure wherein a double bond and a single bond are alternately arranged.

In an embodiment, the conjugated diene-based rubber may be one or more selected from the group consisting of a butadiene polymer, a butadiene-styrene copolymer (SBR), a butadiene-acrylonitrile copolymer (NBR), and an ethylene-propylene copolymer (EPDM). Preferably, the conjugated diene-based rubber is a butadiene polymer, a butadiene-styrene copolymer (SBR), or a mixture thereof.

In an embodiment, the conjugated diene rubber may have an average particle diameter of 800 to 4000 Å, 1500 to 3700 Å, or 2000 to 3500 Å, a gel content of 60 to 95%, 65 to 90%, or 70 to 85%, and a swelling index of 12 to 40, 15 to 35, or 20 to 35. Within this range, superior mechanical properties and property balance are provided.

Transparency of the graft copolymer is determined by a refractive index of a rubber and a refractive index of a total of grafted polymers, and the refractive index of the total of polymers is determined by a mix ratio between monomers. When the refractive index of the conjugated diene rubber and the refractive index of the total of grafted polymers are, for example, the same or a refractive index difference therebetween is, for example, 0.01 or less, transparency is superior. In addition, a refractive index of a mixture or copolymer of the compounds graft-polymerized to the conjugated diene rubber may be calculated according to Mathematical Equation 1 below:

$$RI = \Sigma Wti \times RIi \qquad \text{[Mathematical Equation 1]}$$

Wti=Weight fraction of each ingredient in copolymer (%)
RIi=Refractive index of polymer of each ingredient in copolymer A refractive index of each of the monomers included in the graft copolymer is as follows: butadiene: 1.518, methyl methacrylate: 1.49, methylene butyrolactone: 1.54, styrene 1.59, and acrylonitrile: 1.518.

A method of polymerizing the graft copolymer is not specifically limited and may be emulsion polymerization. Each of the ingredients for grafting may be added batchwise, or a portion or the entirety thereof may be continuously or sequentially added. In addition, a molecular weight of the graft copolymer may be adjusted by adding a molecular weight regulator during polymerization. This molecular weight regulator may be, for example, dodecyl mercaptan. As a particular example, the molecular weight regulator may be t-dodecyl mercaptan, n-dodecyl mercaptan, or a mixture thereof.

(B) Copolymer

In an embodiment, the copolymer may be prepared by copolymerizing a (meth)acrylic acid alkyl ester compound, an aromatic vinyl compound, and a vinyl cyanide compound.

In an embodiment, the copolymer may be prepared by polymerizing 40 to 80% by weight of the (meth)acrylic acid alkyl ester compound, 1 to 40% by weight of the aromatic vinyl compound, and 1 to 35% by weight of the vinyl cyanide compound; or 45 to 75% by weight of the (meth) acrylic acid alkyl ester compound, 5 to 35% by weight of the aromatic vinyl compound, and 1 to 30% by weight of the vinyl cyanide compound. Within this range, superior heat resistance and transparency are exhibited.

In another embodiment, the copolymer may be prepared by polymerizing 50 to 70% by weight of the (meth)acrylic acid alkyl ester compound, 7 to 33% by weight of the aromatic vinyl compound, and 1 to 25% by weight of the vinyl cyanide compound. Within this range, superior heat resistance and transparency are exhibited.

In an embodiment, the copolymer may further include a methylene butyrolactone compound. Within this range, heat resistance is further improved.

In an embodiment, the methylene butyrolactone compound may be included in an amount of 10 to 40% by weight, 15 to 35% by weight, or 16 to 30% by weight based on 100% by weight of the copolymer. Within this range, superior heat resistance and property balance are provided.

In an embodiment, the copolymer may have a weight average molecular weight of 50,000 to 300,000 g/mol, 50,000 to 200,000 g/mol, or 70,000 to 150,000 g/mol. Within this range, impact strength is superior and fluidity is satisfactory, thereby providing superior processability.

A method of polymerizing the copolymer is not specifically limited and may be suspension polymerization or bulk polymerization. Preferably, the method is a continuous bulk polymerization and, in this case, production costs are reduced. In addition, a molecular weight of the copolymer may be adjusted by adding a molecular weight regulator during polymerization. This molecular weight regulator may be, for example, dodecyl mercaptan. As a particular example, the molecular weight regulator may be t-dodecyl mercaptan, n-dodecyl mercaptan, or a mixture thereof.

In an embodiment, a weight ratio of the graft copolymer to the copolymer may be 10:90 to 90:10, 20:80 to 80:20, 30:70 to 70:30, or 40:60 to 60:40. Within this range, transparency and heat resistance are superior.

In an embodiment, a refractive index difference between the graft copolymer and the copolymer may be 0.01 or less, 0.005 or less, or 0.0001 to 0.005. Within this range, superior transparency is provided.

In an embodiment, the thermoplastic resin composition may include 5 to 33% by weight, 10 to 30% by weight, or 15 to 25% by weight of a total of the conjugated diene rubbers. Within this range, processability is superior and flow marks are not formed on a surface, thereby providing superior transparency.

In an embodiment, the thermoplastic resin composition may include 30 to 65% by weight, 35 to 60% by weight, or 40 to 55% by weight of a total of the (meth)acrylic acid alkyl ester compounds. Within this range, superior transparency is provided.

In an embodiment, the thermoplastic resin composition may include 1 to 35% by weight, 1 to 30% by weight, or 3 to 25% by weight of the methylene butyrolactone compound. Within this range, superior transparency is provided.

In an embodiment, the thermoplastic resin composition may include 1 to 30% by weight, 5 to 25% by weight, or 7 to 20% by weight of a total of the aromatic vinyl compounds. Within this range, superior light transmittance is provided and a haze is reduced.

In an embodiment, the thermoplastic resin composition may include 1 to 15% by weight, 1 to 10% by weight, or 2 to 7% by weight of the vinyl cyanide compound. Within this range, superior property balance is provided.

In an embodiment, the thermoplastic resin composition may have a weight average molecular weight of 80,000 to 300,000 g/mol, 100,000 to 250,000 g/mol, or 120,000 to 230,000 g/mol. Within this range, chemical resistance is superior and fluidity is satisfactory, thereby providing superior processability.

In an embodiment, the thermoplastic resin composition may have a glass transition temperature of 110 to 180° C., 115 to 175° C., or 120 to 170° C. Within this range, superior heat resistance and property balance are provided.

In an embodiment, the thermoplastic resin composition may have a haze of 5% or less, 4% or less, or 0.01 to 3% based on ASTM D1003. Within this range, superior transparency and property balance are provided.

In an embodiment, the thermoplastic resin composition may have a light transmittance of 90% or more, or 90 to 99% based on ASTM D1003. Within this range, transparency and superior property balance are provided.

In an embodiment, the thermoplastic resin composition may further include one or more selected from the group consisting of a heat stabilizer, a UV stabilizer, a lubricant, a flame retardant, an antistatic agent, a dye, a pigment, and a release agent.

In an embodiment, the (meth)acrylic acid alkyl ester compound of the present disclosure may be one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

In an embodiment, the methylene butyrolactone compound of the present disclosure may be one or more selected from the group consisting of alpha-methylene-gamma-butyrolactone, gamma-methyl-alpha-methylene-gamma-butyrolactone, beta-methyl-alpha-methylene-gamma-butyrolactone, beta-ethyl-alpha-methylene-gamma-butyrolactone, and beta-butyl-alpha-methylene-gamma-butyrolactone.

In an embodiment, the aromatic vinyl compound of the present disclosure may be one or more selected from the group consisting of styrene, α-methyl styrene, o-ethyl styrene, p-ethyl styrene, and vinyl toluene.

In an embodiment, the vinyl cyanide compound of present disclosure may be acrylonitrile, methacrylonitrile, or a mixture thereof.

In an embodiment, a method of preparing the thermoplastic resin composition of the present disclosure may include a step of melt-kneading and extruding (A) a graft copolymer prepared by graft-polymerizing a conjugated diene rubber, a (meth)acrylic acid alkyl ester compound, a methylene butyrolactone compound, and an aromatic vinyl compound; and (B) a copolymer prepared by polymerizing a (meth)acrylic acid alkyl ester compound, an aromatic vinyl compound, and a vinyl cyanide compound.

In an embodiment, the melt-kneading may be carried out at 220 to 290° C., or 230 to 270° C.

When the copolymer (B) is polymerized, a methylene butyrolactone compound may be further included.

The present disclosure provides a molded article manufactured from the thermoplastic resin composition.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

In the following, "parts by weight" is based on 100 parts by weight of a sum of a polybutadiene rubber and monomers, or, when the polybutadiene rubber is not used, based on 100 parts by weight of a total of the monomers.

Preparation Example A-1

<Preparation of Graft Copolymer>

To prepare a graft copolymer, 100 parts by weight of deionized water, 1.0 part by weight of a sodium oleate emulsifier, 32% by weight of methyl methacrylate, 10% by weight of beta-methyl-alpha-methylene-gamma-butyrolactone, 8% by weight of styrene, 0.3 parts by weight of tertiary dodecyl mercaptan, 0.05 parts by weight of ethylenediamine tetraacetic acid, 0.1 parts by weight of sodium formaldehyde sulfoxylate, 0.001 parts by weight of ferrous sulfate, and 0.2 parts by weight of tertiary butyl hydroperoxide were continuously added to 20 of 50% by weight (based on solids) of a polybutadiene rubber latex having a gel content of 70% by weight, an average particle diameter of 0.3 µm, and a swelling index of 20 prepared by emulsion polymerization at 75° C. over a period of 5 hours and reaction was performed. After terminating reaction, temperature was elevated to 80 ° C. and aging was performed for 1 hour, followed by terminated the reaction. The reaction-termination latex was coagulated with an aqueous calcium chloride solution and washed, followed by obtaining a powder. The obtained graft copolymer exhibited a refractive index of 1.516 and a weight average molecular weight of 80,000 g/mol.

Preparation Example A-2

<Preparation of Graft Copolymer>

An experiment was carried out in the same manner as in Preparation Example A-1, except that 25% by weight of methyl methacrylate, 10% by weight of beta-methyl-alpha-methylene-gamma-butyrolactone, and 15% by weight of styrene were used. An obtained graft copolymer exhibited a refractive index of 1.53 and a weight average molecular weight of 70,000 g/mol.

Preparation Example A-3

<Preparation of Graft Copolymer>

An experiment was carried out in the same manner as in Preparation Example A-1, except that 20% by weight of polybutadiene rubber latex, 54% by weight of methyl methacrylate, 10% by weight of beta-methyl-alpha-methylene-gamma-butyrolactone, and 16% by weight of styrene were used. An obtained graft copolymer exhibited a refractive index of 1.516 and a weight average molecular weight of 80,000 g/mol.

Preparation Example A-4

<Preparation of Graft Copolymer>

An experiment was carried out in the same manner as in Preparation Example A-1, except that 30% by weight of polybutadiene rubber latex, 47% by weight of methyl methacrylate, 10% by weight of beta-methyl-alpha-methylene-gamma-butyrolactone, and 13% by weight of styrene were used. An obtained graft copolymer exhibited a refractive index of 1.516 and a weight average molecular weight of 85,000 g/mol.

Preparation Example A-5

<Preparation of Graft Copolymer>

An experiment was carried out in the same manner as in Preparation Example A-1, except that 37% by weight of methyl methacrylate and 13% by weight of styrene were used and beta-methyl-alpha-methylene-gamma-butyrolactone was not used. An obtained graft copolymer exhibited a refractive index of 1.516 and a weight average molecular weight of 80,000 g/mol.

Preparation Example B-1

<Preparation of Copolymer>

A raw material prepared by mixing 25 parts by weight of ethylbenzene as a solvent, 0.15 parts by weight of di-t-dodecyl mercaptan as a molecular weight regulator, and 0.01 parts by weight of 1,1-bis (t-hexylperoxy)-3,3,5-trimethyl-cyclohexane as a radical initiator was continuously fed into a reaction tank containing 52% by weight of methyl methacrylate, 30% by weight of beta-methyl-alpha-methylene-gamma-butyrolactone, 8% by weight of styrene, and 10% by weight of acrylonitrile during an average reaction time of three hours and reaction temperature was maintained at 148° C. A polymerized liquid discharged from the reaction tank was heated in a preliminary heating tank, unreacted monomers were volatilized using a volatilizer, and a copolymer resin was pelletized by means of a polymer transfer pump extruder while maintaining a temperature of a polymer at 210° C. The obtained copolymer exhibited a refractive index of 1.516 and a weight average molecular weight of 100,000 g/mol.

Preparation Example B-2

<Preparation of Copolymer>

An experiment was carried out in the same manner as in Preparation Example B-1, except that 59% by weight of methyl methacrylate, 16% by weight of beta-methyl-alpha-methylene-gamma-butyrolactone, 15% by weight of styrene, and 10% by weight of acrylonitrile were used. The copolymer exhibited a refractive index of 1.516 and a weight average molecular weight of 97,000 g/mol.

Preparation Example B-3

<Preparation of Copolymer>

An experiment was carried out in the same manner as in Preparation Example B-1, except that 67% by weight of methyl methacrylate and 23% by weight of styrene were used and beta-methyl-alpha-methylene-gamma-butyrolactone was not added. The copolymer exhibited a refractive index of 1.516 and a weight average molecular weight of 95,000 g/mol.

Preparation Example B-4

<Preparation of Copolymer>

An experiment was carried out in the same manner as in Preparation Example B-1, except that 63% by weight of methyl methacrylate, 20% by weight of beta-methyl-alpha-methylene-gamma-butyrolactone, 16% by weight of styrene, and 1% by weight of acrylonitrile were used. The copolymer exhibited a refractive index of 1.50 and a weight average molecular weight of 100,000 g/mol.

Examples 1 to 3 and Comparative Examples 1 to 4

The ingredients were respectively added in contents summarized in Table 1 below and mixed by means of a mixer. Each of resultant mixtures was extruded by means of a twin-screw extruder at 260° C., and then pelletized, followed by drying at 80° C. for 4 hours or more. Subsequently, injection molding was performed, thereby manufacturing a specimen for measuring properties. The manufactured specimen was allowed to stand at room temperature for 48 hours.

Test Example

Properties of the thermoplastic resin composition prepared according to each of Examples 1 to 3 and Comparative Examples 1 to 4 were measured according to the following methods. Results are summarized in Table 2 below.

Average particle diameter: Measured by means of a NICOMP 380 as a particle size analyzer.

Glass transition temperature (° C.): Measured by means of a DSC Q100 (manufactured by TA Instruments).

Weight average molecular weight (g/mol): A sample was dissolved in tetrahydrofuran (THF) and a weight average molecular weight thereof was measured using GPC.

Refractive index: A specimen was sliced to a thickness of about 0.2 mm, and then a refractive index thereof was measured at 25° C. by means of an Abbe refractometer.

Gel content and swelling index: A rubber latex was coagulated using a dilute acid or a metal salt, followed by washing and drying in a 60° C. vacuum oven for 24 hours. Subsequently, an obtained rubber mass was finely cut with scissors. Subsequently, 1 g of a resultant rubber piece was placed in 100 g of toluene and stored in a room-temperature dark room for 48 hours, followed by separating into a sol and a gel. A gel content and a swelling index were measured according to Mathematical Equations 2 and 3 below:

Gel content (%)=[Weight of insoluble substance (gel)/weight of sample]×100      [Mathematical Equation 2]

Swelling index=Weight of swelled gel/weight of gel      [Mathematical Equation 3]

Light transmittance (%): Measured according to ASTM 1003.

Haze (%): Measured according to ASTM 1003.

TABLE 1

| Classification | Graft copolymer | | | | | copolymer | | | |
|---|---|---|---|---|---|---|---|---|---|
| | A-1 | A-2 | A-3 | A-4 | A-5 | B-1 | B-2 | B-3 | B-4 |
| Example 1 | 40 | | | | | 60 | | | |
| Example 2 | | | | 70 | | | 30 | | |
| Example 3 | 40 | | | | | | | 60 | |
| Comparative Example 1 | | | | | 40 | | 60 | | |
| Comparative Example 2 | | 40 | | | | | | | 60 |
| Comparative Example 3 | | | 70 | | | | | | 30 |
| Comparative Example 4 | | | | | 70 | | 30 | | |

TABLE 2

| Classification | Light transmittance | Haze | Glass transition temperature |
|---|---|---|---|
| Example 1 | 90 | 2.5 | 137 |
| Example 2 | 90 | 2.2 | 123 |
| Example 3 | 91 | 2.4 | 110 |
| Comparative Example 1 | 90 | 2.2 | 98 |
| Comparative Example 2 | Opaque | Opaque | 130 |
| Comparative Example 3 | 67 | 50 | 128 |
| Comparative Example 4 | 85 | 8.0 | 103 |

As shown in Table 2, the thermoplastic resin compositions (Examples 1 to 3) according to the present disclosure exhibited superior transparency due to a high light transmittance and a low haze and superior heat resistance due to a high glass transition temperature.

On the other hand, in the case of Comparative Example 1 in which the beta-methyl-alpha-methylene-gamma-butyrolactone is not included in the graft copolymer, glass transition temperature was low. In addition, in the cases of Comparative Examples 2 and 3, a refractive index difference between the graft copolymer and the copolymer was very large although glass transition temperature was high, whereby transparency was greatly decreased. Further, in the case of Comparative Example 4 in which beta-methyl-alpha-methylene-gamma-butyrolactone was not included in the graft copolymer and the polybutadiene rubber latex was included in a large amount, glass transition temperature and transparency were deteriorated.

The invention claimed is:

1. A thermoplastic resin composition, comprising:
   (A) a graft copolymer prepared by graft-copolymerizing a conjugated diene rubber, a (meth)acrylic acid alkyl ester compound, a methylene butyrolactone compound, and an aromatic vinyl compound; and
   (B) a copolymer prepared by copolymerizing a (meth)acrylic acid alkyl ester compound, an aromatic vinyl compound, and a vinyl cyanide compound.

2. The thermoplastic resin composition according to claim 1, wherein a weight ratio of the graft copolymer (A) to the copolymer (B) is 10:90 to 90:10.

3. The thermoplastic resin composition according to claim 1, wherein a refractive index difference between the graft copolymer (A) and the copolymer (B) is 0.01 or less.

4. The thermoplastic resin composition according to claim 1, wherein the thermoplastic resin composition comprises 5 to 33% by weight of a total of the conjugated diene rubbers, 30 to 65% by weight of a total of the (meth)acrylic acid alkyl ester compounds, 1 to 35% by weight of the methylene butyrolactone compound, 1 to 30% by weight of a total of the aromatic vinyl compounds, and 1 to 15% by weight of the vinyl cyanide compound.

5. The thermoplastic resin composition according to claim 1, wherein the graft copolymer (A) is prepared by graft-polymerizing 10 to 60% by weight of the conjugated diene rubber, 15 to 65% by weight of the (meth)acrylic acid alkyl ester compound, 1 to 20% by weight of the methylene butyrolactone compound, and 3 to 30% by weight of the aromatic vinyl compound.

6. The thermoplastic resin composition according to claim 1, wherein the graft copolymer (A) has a weight average molecular weight of 50,000 to 300,000 g/mol.

7. The thermoplastic resin composition according to claim 1, wherein the copolymer (B) is prepared by polymerizing 40 to 80% by weight of the (meth)acrylic acid alkyl ester compound, 1 to 40% by weight of the aromatic vinyl compound, and 1 to 35% by weight of the vinyl cyanide compound.

8. The thermoplastic resin composition according to claim 7, wherein the copolymer (B) further comprises 10 to 40% by weight of a methylene butyrolactone compound.

9. The thermoplastic resin composition according to claim 1, wherein the copolymer (B) has a weight average molecular weight of 50,000 to 300,000 g/mol.

10. The thermoplastic resin composition according to claim 1, wherein the conjugated diene rubber is one or more selected from the group consisting of a butadiene polymer, a butadiene-styrene copolymer (SBR), a butadiene-acrylonitrile copolymer (NBR), and an ethylene-propylene copolymer (EPDM).

11. The thermoplastic resin composition according to claim 1, wherein the conjugated diene rubber has an average particle diameter of 800 to 4000 Å, a gel content of 60 to 95%, and a swelling index of 12 to 40.

12. The thermoplastic resin composition according to claim 1, wherein the (meth)acrylic acid alkyl ester compound is one or more selected from the group consisting of (meth)acrylic acid methyl ester, (meth)acrylic acid ethyl ester, (meth)acrylic acid propyl ester, (meth)acrylic acid 2-ethylhexyl ester, (meth)acrylic acid decyl ester, and (meth)acrylic acid lauryl ester.

13. The thermoplastic resin composition according to claim 1, wherein the methylene butyrolactone compound is one or more selected from the group consisting of alpha-methylene-gamma-butyrolactone, gamma-methyl-alpha-methylene-gamma-butyrolactone, beta-methyl-alpha-methylene-gamma-butyrolactone, beta-ethyl-alpha-methylene-gamma-butyrolactone, and beta-butyl-alpha-methylene-gamma-butyrolactone.

14. The thermoplastic resin composition according to claim 1, wherein the thermoplastic resin composition has a weight average molecular weight of 80,000 to 300,000 g/mol.

15. The thermoplastic resin composition according to claim 1, wherein the thermoplastic resin composition has a glass transition temperature of 110 to 180° C.

16. The thermoplastic resin composition according to claim 1, wherein the thermoplastic resin composition has a haze of 5% or less based on ASTM D1003.

17. The thermoplastic resin composition according to claim 1, wherein the thermoplastic resin has a light transmittance of 90% or more based on ASTM D1003.

18. A method of preparing a thermoplastic resin composition, the method comprising: a step of melt-kneading and extruding (A) a graft copolymer prepared by graft-polymerizing a conjugated diene rubber, a (meth)acrylic acid alkyl ester compound, a methylene butyrolactone compound, and an aromatic vinyl compound; and (B) a copolymer prepared by polymerizing a (meth)acrylic acid alkyl ester compound, an aromatic vinyl compound, and a vinyl cyanide compound.

19. The method according to claim 18, wherein, when the copolymer (B) is polymerized, a methylene butyrolactone compound is further comprised.

20. A molded article manufactured from the thermoplastic resin composition according to claim 1.

* * * * *